US000001813H

United States Statutory Invention Registration [19]

[11] Reg. Number: H1,813

Kersey

[45] Published: Nov. 2, 1999

[54] SPECTRALLY-SELECTIVE FIBER TRANSMISSION FILTER SYSTEM

[76] Inventor: Alan D. Kersey, 9305 Silvercreek Ct., Fairfax Station, Va. 22039

[21] Appl. No.: 08/154,419

[22] Filed: Nov. 19, 1993

[51] Int. Cl.[6] ..... H01S 3/83

[52] U.S. Cl. ..... 372/94; 372/6; 372/9; 372/20; 372/32

[58] Field of Search ..... 385/1, 4, 13, 14, 385/24, 37, 40; 372/6, 32

[56] References Cited

U.S. PATENT DOCUMENTS

| | | | |
|---|---|---|---|
| 4,268,116 | 5/1981 | Schmadel et al. | 385/14 |
| 4,482,248 | 11/1984 | Papuchon et al. | 356/346 |
| 4,725,110 | 2/1988 | Glenn et al. | 350/3.61 |
| 4,807,950 | 2/1989 | Glenn et al. | 350/3.61 |
| 4,815,081 | 3/1989 | Mahlein et al. | 372/32 |
| 4,973,124 | 11/1990 | Kaede | 385/14 |
| 5,007,705 | 4/1991 | Morey et al. | 350/96.29 |
| 5,022,038 | 6/1991 | Bradley | 372/50 |
| 5,056,101 | 10/1991 | Magill et al. | 372/32 |
| 5,077,816 | 12/1991 | Glomb et al. | 385/37 |
| 5,113,275 | 5/1992 | Patel et al. | 359/86 |
| 5,134,620 | 7/1992 | Huber | 359/337 |
| 5,151,908 | 9/1992 | Huber | 372/6 |
| 5,159,601 | 10/1992 | Huber | 372/6 |
| 5,182,779 | 1/1993 | D'Agostino et al. | 385/13 |
| 5,185,827 | 2/1993 | Poole | 385/28 |
| 5,189,676 | 2/1993 | Wysocki et al. | 372/6 |
| 5,191,586 | 3/1993 | Huber | 372/6 |
| 5,200,964 | 4/1993 | Huber | 372/27 |
| 5,208,819 | 5/1993 | Huber | 372/32 |
| 5,237,576 | 8/1993 | DiGioyanni et al. | 372/6 |
| 5,243,609 | 9/1993 | Huber | 372/19 |
| 5,271,024 | 12/1993 | Huber | 385/37 X |
| 5,283,686 | 2/1994 | Huber | 359/337 |
| 5,309,260 | 5/1994 | Mizrahi et al. | 385/37 |

OTHER PUBLICATIONS

All fiber, low thershold, Widely tunable Single–frequency, erbium–doped fiber ring laser with a tandem fiber Fabry–Perot filter By Vahala et al. (pp. 2369–2371) Appl. phys. Lett. 59(19), Nov. 4, 1991.

"Multiplexing fiber bragg goating sensors" By Meltz et al. SPIE proceedings vol. 1586, Sep. 1991.

"Narrow linewidth Tunable Operation of $Er^3$t–Doped Single–mode fibre laser" By Maton et al. Electronics letters, Apr. 13, 1989, vol. 25, No. 8.

"Single–frequency Traveling–wave Erbium–Doped fibre loop laser" By Payne et al., Elect. letters, Jan. 31, 1991, vol. 27, No. 3.

*Primary Examiner*—Daniel T. Pihulic

[57] ABSTRACT

An in-line, spectrally-selective fiber Fabry-Perot transmission filter includes an optical fiber piece having a broad-band mirror and a narrow-band Bragg grating element formed therein, the mirror and the grating forming a Fabry-Perot resonant cavity therebetween. The filter may be used to form part of a fiber ring laser configuration. The combination of the broad-band mirror and the narrow-band Bragg grating element in an optical fiber piece can also be formed into a spectrally-selective fiber Michelson filter.

16 Claims, 6 Drawing Sheets

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

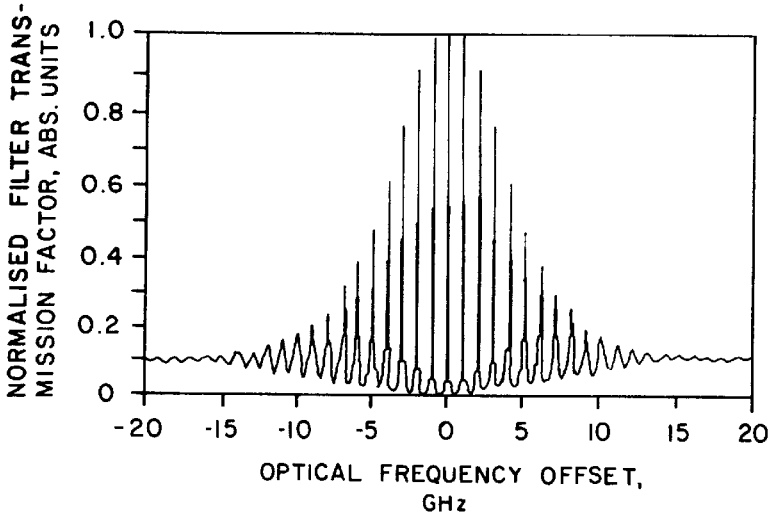
FIG. 2A
FIG. 2B
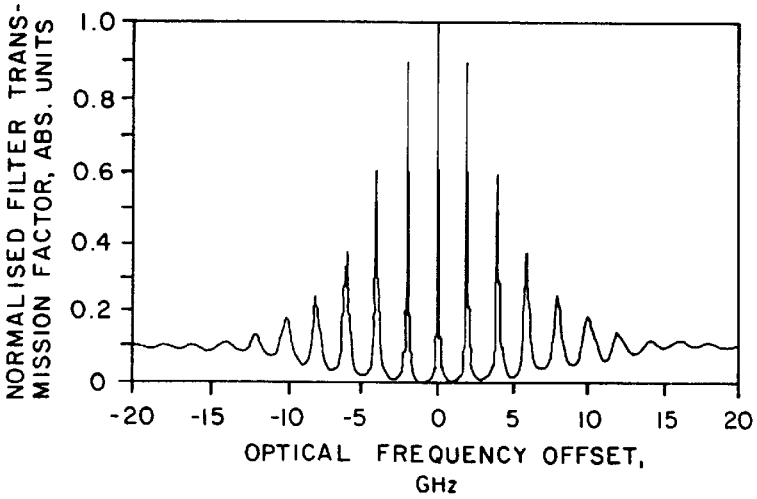
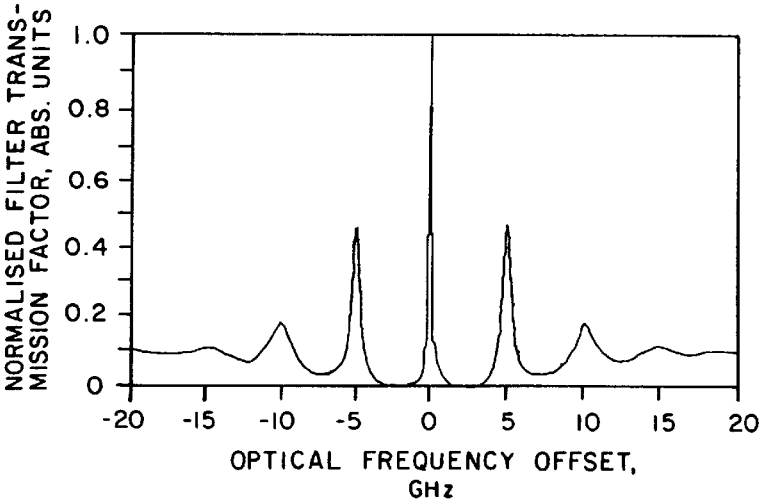
FIG. 2C

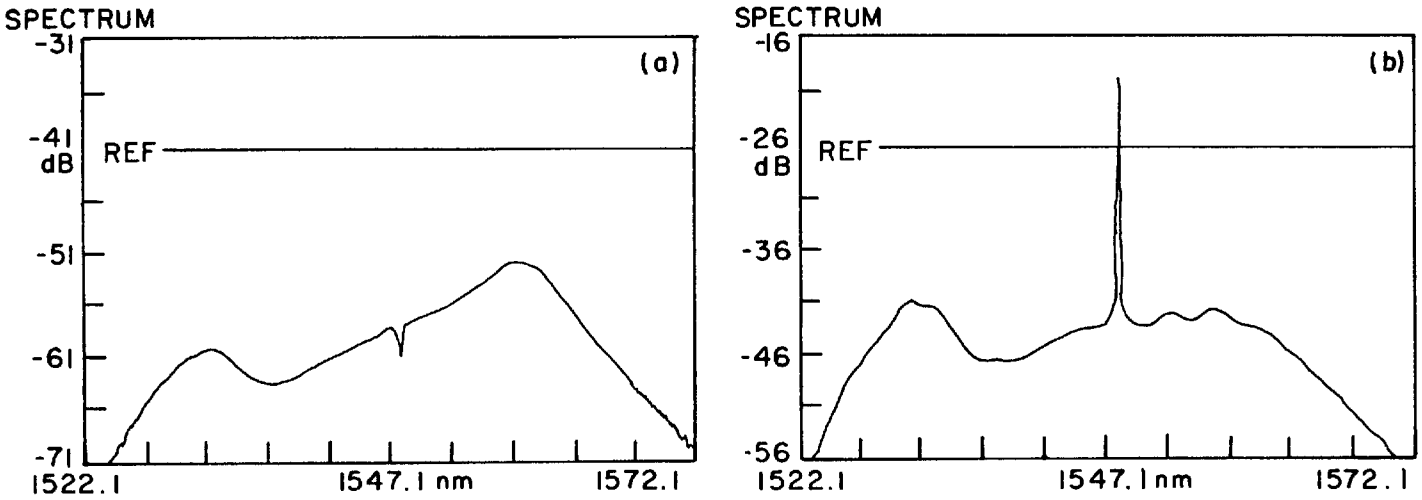
FIG. 5A
FIG. 5B
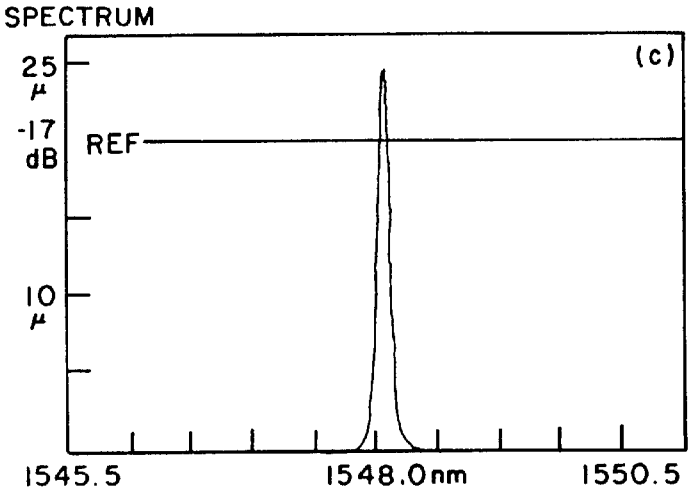
FIG. 5C

SPECTRALLY-SELECTIVE FIBER TRANSMISSION FILTER SYSTEM

BACKGROUND OF THE INVENTION

1. Field of the Invention

The invention relates to the field of optical filters, and in particular to filter arrangements using fiber Bragg grating elements.

2. Description of the Related Art

It is known to form phase gratings along the core of an optical waveguide, for example, by the application of intense beams of ultraviolet light transverse to the axis of the core at selected angles of incidence and the compliments thereto. In particular, an intra-core fiber Bragg grating (FBG) element can be formed in a Ge-doped fiber using side illumination to form an ultraviolet (UV) interference pattern, as disclosed in, for example, G. Meltz, W. W. Morey, and W. H. Glenn, "Formation of Bragg gratings in optical fiber by a Transverse Holographic Method," Optics Letters, 14, pp 823–825, 1989.

In this known process, the gratings are formed by transverse irradiation with a particular wavelength of light in the ultraviolet absorption band of the core material, establishing a first order absorption process by which gratings characterized by a particular spacing and wavelength can be formed by illuminating the core from the side with two coplanar, coherent beams incident at selected and complementary angles thereto with respect to the axis of the core. The grating period is selected by varying the selected angles of incidence. Thus, a permanent change in the refractive index is induced in a predetermined region of the core, creating, in effect, a phase grating for affecting light in the core at selected wavelengths. See U.S. Pat. Nos. 4,725,110 and 4,807,950.

The Bragg wavelength of these elements, that is, the wavelength of incident light which will be reflected back, depends on the spacing of the lines in the fiber Bragg grating, i.e., the periodicity of the UV interference pattern and the resultant core-index of refraction modulation in the fiber, as well as the effective index (combination of core index and cladding index) of the guided optical mode.

These intra-core fiber Bragg grating elements are suitable as optical wavelength sensor elements, e.g., strain or temperature sensors, since the Bragg wavelength will be changed by a change in the temperature and/or the strain on the fiber which modifies the spacing and index of refraction of the grating.

An additional known use of these fiber Bragg grating elements is in wavelength filtering, since the basic device acts as a narrow-band band-reject or notch-filter for light transmitted through the element, and as a selective narrow-band bandpass filter for light reflected from the element. By using a pair of identical grating reflectors, a Fabry-Perot interferometer can be formed as a sensor element in the fiber, with an enhanced sensitivity, see W. W. Morey, J. R. Dunphy and G. Meltz, "Multiplexed Fiber Bragg Grating Sensors", Proc. 'Distributed and Multiplexed Fiber Optic Sensors', SPIE vol. 1586, pp. 216–224, Boston, Sep., 1991.

Various methods of wavelength stabilization and tuning of lasers, in particular doped-fiber ring laser configurations, are also known. See, for example, P. R. Morkel, G. J. Cowle, and D. N. Payne, "Travelling-Wave Erbium Fiber Ring Laser with 60 kHz Linewidth", Electron Letter, 26, pp. 632–634, 1990; K. Iwatsuki, H. Okamura and M. Saruwatari, "Wavelength-Tunable Single-Frequency and Single Polarization Er-Doped Fiber Ring Laser with 1.4 kHz Linewidth", Electron. Letter, 26, pp. 2033–2035, 1990; and N. Park, J. W. Dawson, K. J. Vahala and C. Miller, "All-Fiber, Low Threshold, Widely Tunable Single Frequency, Erbium-Doped Fiber Ring Laser with a Tandem Fiber Fabry Perot Filter", Appl. Phys. Letter, 59, pp. 2369–2371, 1991.

Ring laser systems have traditionally suffered from large cavity losses, a small tuning range, or severe mode hopping. The above mentioned N. Park et al. paper discloses an all fiber, single-frequency ring laser configuration using two fiber Fabry-Perot cavity filters, one narrow-band and one broad-band, to provide narrow bandpass wavelength filtering for stable and tunable laser operation which completely suppressed mode hopping.

This ring laser configuration used a temperature compensated, electronically tunable broad-band fiber Fabry-Perot (FFP) filter with low insertion loss and high finesse (see C. M. Miller and F. J. Janniello, Electron. Lett. 26, 632, 1990) in tandem with a further narrow-band FFP. However, even though the insertion loss of the FFP's is "low," each FFP filter element adds an insertion loss of 2.5 dB to the ring laser and the required isolators between each FFP add additional losses of 1dB each.

SUMMARY OF THE INVENTION

Therefore, there existed a need for a single simple fiber transmission filter for use with a fiber ring laser which provides a narrow bandpass characteristic in an in-line fiber geometry with reduced amounts of insertion loss. With the losses reduced, less gain is needed and demands on the pump laser are advantageously reduced.

This need is met by a filter according to an embodiment of the present invention which utilizes a combination of a broad-band mirror and narrow-band fiber Bragg grating (FBG) element to thereby form either a spectrally-selective fiber Fabry-Perot (SSFFP) filter or a spectrally-selective fiber Michelson (SSFM) filter, which filter combines both narrow-band and broad-band characteristics in a single filter element.

At wavelengths outside of the fiber Bragg grating (FBG) bandwidth, light incident on the cavity formed between the grating and the mirror is reflected by the mirror. Within the FBG bandwidth, the Fabry-Perot transmission characteristics allow transmission at certain wavelengths, dependent on the cavity length.

Advantageously, the present invention thus provides a single narrow bandpass filter in an in-line form. The passband characteristics of the filter comprise a series of narrow peaks within an envelope determined by the fiber Bragg grating (FBG) bandwidth. The filter according to the present invention is advantageously suitable for wavelength stabilization and/or tuning of lasers, and in particular, fiber ring laser configurations. Therefore, according to one embodiment of the invention, the wavelength selective filter forms a spectrally selective element for stabilization of the wavelength of a doped fiber ring laser configuration.

According to an embodiment of the invention, the fiber-optical filter is formed in a fiber piece and includes a broad-bandwidth mirror formed in the fiber piece, and a narrow-bandwidth fiber Bragg grating element formed some distance L from the broad-band mirror in the fiber piece. The broad-band mirror and the narrow-band fiber Bragg grating element form therebetween a Fabry-Perot cavity in the fiber piece resonant in a wavelength region where the fiber Bragg grating element has a relatively high reflectance.

An in-line, spectrally-selective fiber Fabry-Perot transmission filter according to the invention is thus formed in an optical fiber piece. The broad-band mirror and narrow-band Bragg grating element are advantageously formed integrally in the fiber to form the in-line spectrally-selective fiber Fabry-Perot resonant cavity therebetween. The Bragg grating element may be, for example, an intra-core fiber Bragg grating or a side-polished fiber Bragg grating.

In one particularly advantageous embodiment of the filter having particular usefulness in an Er doped fiber ring laser, the Bragg grating element has a center wavelength in the range from about 1525 nm to about 1565 nm, an exemplary narrow bandwidth of less than 0.2 nm, and an exemplary peak reflectivity of about 95%, and the mirror is a metalized fiber-fiber connector having a reflectivity approximately equal to the peak reflectivity of the Bragg grating element.

According to another embodiment of the invention, a fiber ring laser configuration for providing an optical output signal includes a fiber amplifier unit having a pump laser, an amplifying fiber piece and a first coupler, the first coupler coupling the pump laser output and an input to be amplified into the amplifying fiber piece, the amplifying fiber piece providing the output of the fiber amplifier unit. A first isolation means is provided, coupled to receive the output of the fiber amplifier unit, for providing unidirectional operation. A fiber optical filter means is provided for narrow bandpass wavelength filtering of the output of the fiber amplifier unit. The filter means has a first end coupled to the first isolation means, and includes a broad-bandwidth mirror and a narrow-bandwidth fiber Bragg grating element formed some distance L from the broad-band mirror. The broad-band mirror and the narrow-band fiber Bragg grating element form therebetween a Fabry-Perot cavity. A second coupler, coupled to a second end of the fiber-optical filter means receives a narrow-band wavelength filtered output therefrom, the second coupler providing a portion of the narrow-band wavelength filtered output as the optical output signal of the ring laser configuration. A second isolation means is provided, coupled to the second coupler to receive a portion of the narrow-band wavelength filtered output of the filter means and to provide the portion of the narrow-band wavelength filtered output received from the second coupler as the input (to be amplified) to the first coupler.

In a further embodiment, at least one polarization controller for adjusting the fiber ring laser configuration gain is also provided.

In a further embodiment of the fiber ring laser configuration according to the invention, the narrow-bandwidth fiber Bragg grating element is an intra-core Bragg grating having a center wavelength in the range from about 1525 nm to about 1565 nm, an exemplary narrow bandwidth of less than 0.2 nm, and an exemplary peak reflectivity of about 95%; and the broad-band mirror is a metalized fiber-fiber connector having a reflectivity approximately equal to the peak reflectivity of the Bragg grating element.

In another embodiment of the invention, a spectrally-selective fiber Michelson (SSFM) interferometric filter is formed as first and second fiber arms coupled together by a coupler, the first fiber arm having a mirror element disposed therein and the second fiber arm having a fiber Bragg grating element formed therein. In a further embodiment of the SSFM filter, the fiber Bragg grating element has an exemplary peak reflectivity of about 95%, a center wavelength in the range from about 1525 nm to about 1565 nm, and an exemplary narrow bandwidth of less than 0.2 nm; and the mirror element is formed by a metalized fiber-fiber connector with an exemplary reflectivity approximately equal to the peak reflectivity of the Bragg grating element. In a further embodiment of the invention, the SSFM filter is part of a fiber ring laser configuration.

BRIEF DESCRIPTION OF THE DRAWINGS

The above and other advantageous features and objects of the invention will become apparent from the following detailed description taken with the drawings, in which:

FIGS. 2A, 2B and 2C are a series of graphs of calculated filter transmission functions for the filter of FIG. 1A for various cavity lengths L (assuming $R_m$=0.9, $R_g$(peak)=0.9, $BW_{BGF}$=0.1 nm), where in FIG. 2A: L=10 cm; in FIG. 2B: L=5 cm; and in FIG. 2C: L=2 cm;

FIGS. 5A, 5B and 5C are a series of graphs of the output spectra of the ring laser configuration shown in FIG. 4, FIG. 5A being with the ring disconnected (at point A in FIG. 4), FIG. 5B being with the ring closed, and FIG. 5C being an optical spectrum analyzer limited resolution of the lasing mode at a Bragg wavelength of 1548.1 nm; FIGS. 5A and 5B having a dB power scale, 50 nm span, and FIG. 5C having a linear power scale, 5 nm span;

DETAILED DESCRIPTION OF THE PREFERRED EMBODIMENTS

The invention will now be described in more detail by example with reference to the embodiments shown in the Figures. It should be kept in mind that the following described embodiments are only presented by way of example and should not be construed as limiting the inventive concept to any particular physical configuration.

Figure 1A:
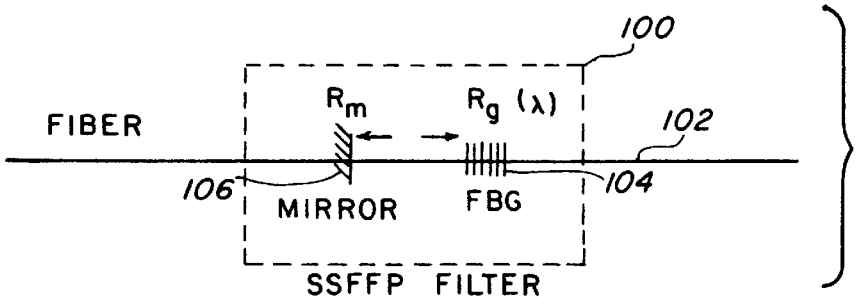
FIGS. 1A, 1B and 1C relate to an embodiment of the mirror-Bragg grating (SSFFP) filter according to the invention, the graphs in FIGS. 1B and 1C showing the wavelength dependent reflectivities of the two elements of FIG. 1A which form an embodiment of the filter according to the present invention.

FIG. 1A shows a schematic of a spectrally-selective fiber Fabry-Perot (SSFFP) filter configuration 100 according to an embodiment of the present invention. A Fabry-Perot cavity is formed in fiber 102 between a narrow-band fiber Bragg grating (FBG) reflector 104 and a broad-band mirror 106.

Figure 1B:
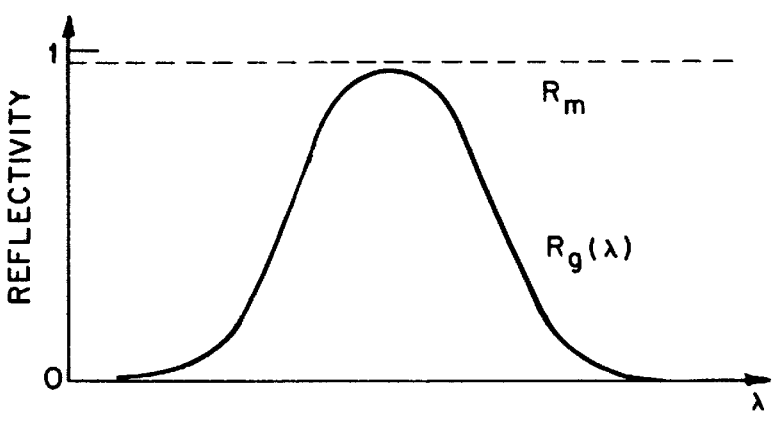

The spectral reflection characteristics $R_g$ and $R_m$ of the two elements, i.e., the fiber Bragg grating 104 and the mirror 106, respectively, versus wavelength (λ) are depicted in FIG. 1B.

Figure 1C:
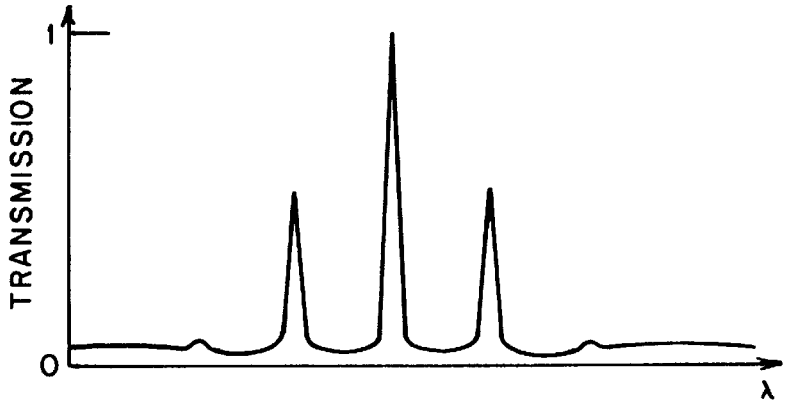

The combination of the fiber Bragg grating (FBG) 104 and the mirror 106 form a resonant cavity only in the wavelength region where the FBG reflectance is high (i.e., within the FBG bandwidth), which has the transmission characteristics as represented in FIG. 1C. At other wavelengths, the high reflectivity mirror 106 reflects most of the light, resulting in a low transmission characteristic equal to (1-$R_m$), where $R_m$ is the mirror reflectivity. The resulting pass-band transmission characteristics of the filter 100 depend on the cavity length L between the mirror 106 and the FBG element 104, the mirror reflectivity $R_m$, and the peak reflectivity ($R_g$) and bandwidth of the FBG element 104.

The SSFFP filter transmission characteristics can be derived from the basic theory of Fabry-Perot interferometry by including a wavelength dependent reflectivity, $R_g(\lambda)$, to describe the Bragg grating. Assuming negligible losses in the mirror or grating, the transfer function is:

$$\frac{IT}{I_o} = \frac{(1 - R_g(\lambda))(1 - R_m)}{\left\{1 - 2\sqrt{(R_g(\lambda)R_m)}\cos\delta + R_g(\lambda)R_m\right\}},$$

where $R_m$ is the mirror reflectivity, and δ is the cavity phase delay given by $$\delta = \frac{4\pi\, nL}{\lambda},$$

with L the cavity length and n the fiber index.

FIGS. 2A, 2B and 2C show examples of the calculated transmission characteristics for various mirror and peak grating reflectivities. Here the grating reflection function is modeled as a Gaussian curve with 1/e bandwidth Δλ, i.e.:

$$R_g(\lambda) = R_g(\lambda_o)\exp\left\{-\frac{4(\lambda - \lambda_o)^2}{\Delta\lambda^2}\right\},$$

where $R_g(\lambda_o)$ is the peak reflectivity of the Bragg grating at the central wavelength $\lambda_o$.

As seen in FIGS. 2A, 2B and 2C, within the grating bandwidth the transmission is characterized by the Fabry-Perot resonance peaks, whereas outside the FGB bandwidth, the transmission falls to a constant value determined by the mirror reflectance coefficient.

The filter according to the present invention can be advantageously used within a fiber ring laser configuration to provide narrow-band wavelength filtering for providing stable and tunable ring laser operation. Because of temperature effects on spacing and index of refraction, the filter would be used in a temperature controlled environment to minimize these effects.

Figure 3A:
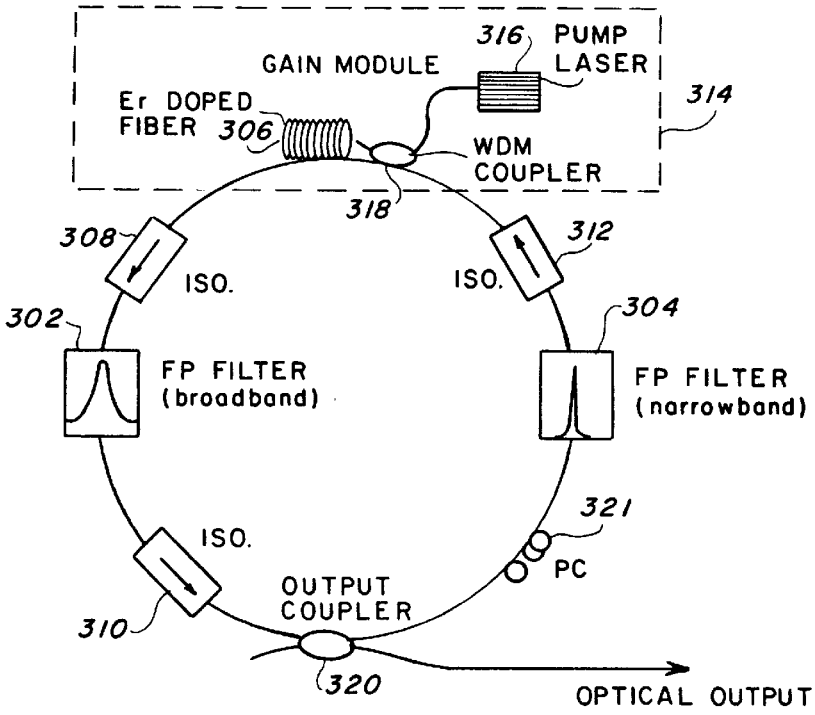
(PRIOR ART) FIG. 3A
FIGS. 3A and 3B relate to a basic single-frequency, Er-fiber ring laser configuration with a tandem arrangement of fiber Fabry-Perot (FFP) filters representative of the prior art, FIG. 3A being the optical arrangement, and FIG. 3B being the optical transmission characteristics of the tandem FFP filters.

FIG. 3A shows a ring laser system such as that described in N. Park, J. W. Dawson, K. J. Vahala and C. Miller, "All-Fiber, Low Threshold, Widely Tunable Single Frequency, Erbium-Doped Fiber Ring Laser with a Tandem Fiber Fabry Perot Filter", Appl. Phys. Letter, 59, pp. 2369–2371, 1991, which represents a state-of-the-art single frequency fiber ring laser configuration.

This illustrated ring laser configuration includes a gain module 314 consisting of an Er doped fiber piece 306, pump laser 316 and wavelength division multiplexer (WDM) coupler 318, and incorporates two fiber Fabry-Perot cavity filters 302 and 304 in the fiber ring, one broad-band and the other narrow-band, respectively. The use of isolators 308, 310 and 312 to allow only unidirectional operation promotes single-frequency operation by eliminating spatial hole burning in the active fiber section, i.e., the Er doped fiber piece 306. The optical output is provided by output coupler 320. A conventional polarization controller 321 ($PC_1$) is provided and can be adjusted to optimize the gain.

Figure 3B:
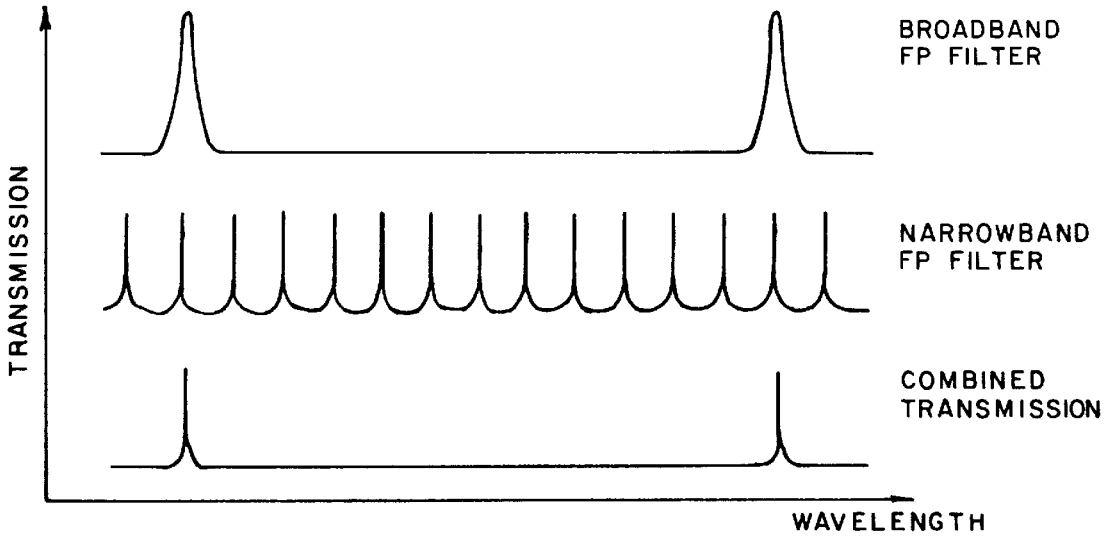
(PRIOR ART) FIG. 3B

The effective transmission characteristics of the combination of filters 302 and 304 is determined by the product of their transfer functions, as is shown in FIG. 3B.

In the typical operation of this ring laser arrangement, the broad-band Fabry-Perot (BBFP) filter 302 has a free spectral range (FSR) approximately equal to the gain bandwidth of the Er doped fiber 306 (≈>30 nm for Er doped fiber), whereas the narrow-band Fabry-Perot (NBFP) filter 304 has an FSR of about 1 nm and a bandwidth of about 0.01 nm (corresponding to approximately 1.3 GHz at 1.55 μm). The very narrow-band wavelength selection ensures that the gain of the ring is high only for a series of narrow wavelength bands, and thus lasing occurs at the ring cavity modes within the tandem Fabry-Perot filter transfer function.

As previously mentioned, each Fabry-Perot filter and required isolator disadvantageously inserts a loss into this ring laser system. A fiber ring laser device incorporating an in-line spectrally-selective fiber Fabry-Perot filter according to the present invention advantageously eliminates the need for two Fabry-Perot filters by combining both narrow-band and broad-band filtering characteristics in one element. The present invention provides the desired passband characteristics and associated benefits with a single filter and, therefore, minimizes the losses associated with using two filters, etc. in the prior art.

Figure 4:
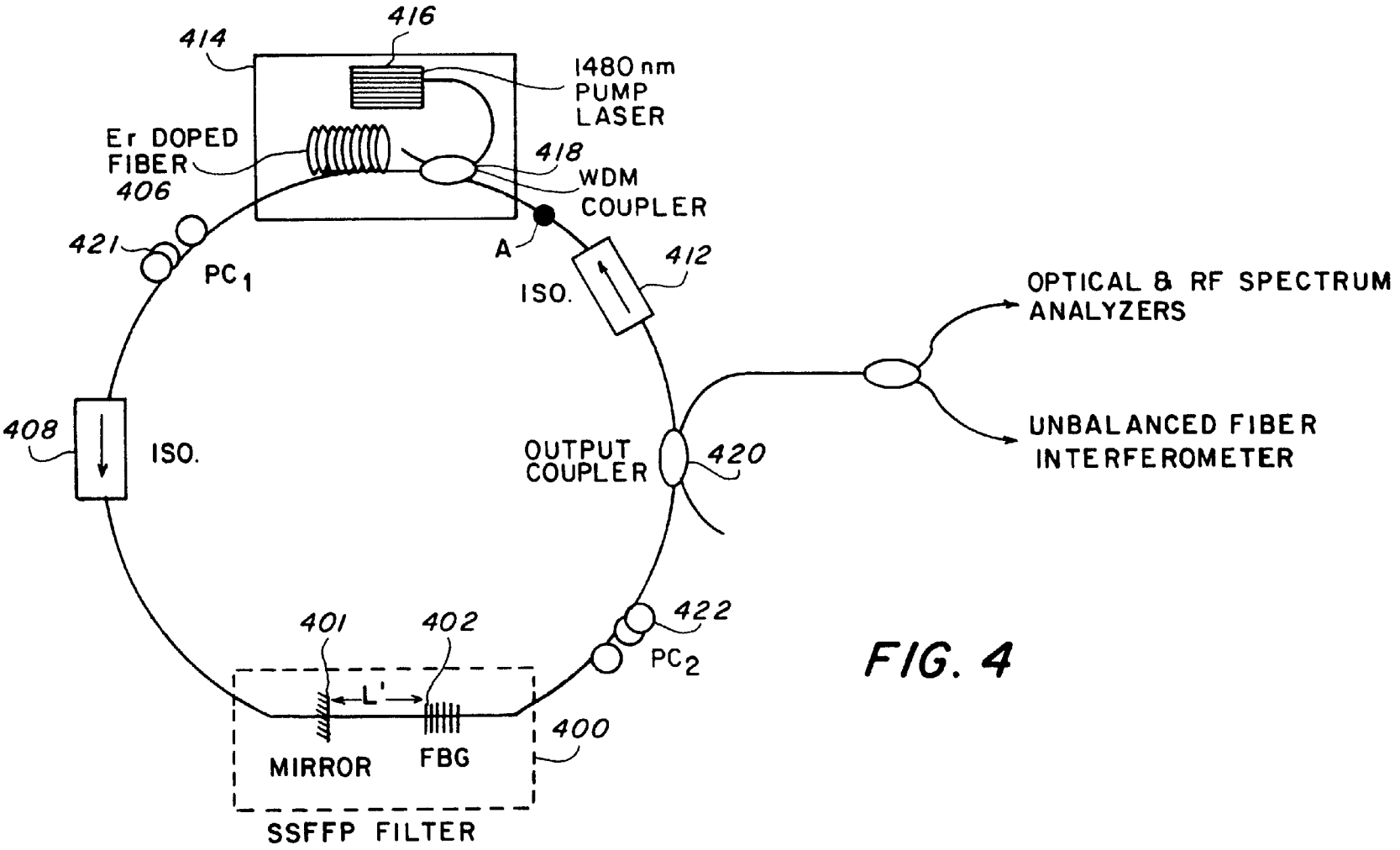
FIG. 4 is an Er-fiber ring laser configuration having a filter including a mirror and fiber Bragg grating according to the present invention.

FIG. 4 shows such a ring laser configuration according to the present invention utilizing an in-line spectrally-selective fiber Fabry-Perot (SSFFP) filter 400 to provide an optical fiber means for narrow-band wavelength filtering. In the illustrated embodiment of this configuration, a conventional fiber amplifier unit was used as the gain module 414. This unit comprises, for example, 20 m of Er-doped fiber 406, a 1480 nm pump laser 416 and WDM coupler 418, and has a maximum small-signal gain of 24 dB at 1555 nm.

The ring incorporates two isolators 408 and 412 to provide unidirectional operation and to prevent reflections off the mirror 401 or fiber Bragg grating (FBG) element 402 from forming additional intra-ring cavities which may lead to instabilities, although in practice only one of the isolators may really be required, the second one being provided as an extra protection for the expensive laser source. The fiber Bragg grating 402 is, for example, centered at 1548.1 nm with a bandwidth of about 0.2 nm, and a peak reflectivity of about 85%. The mirror 401 is, for example, a metalized fiber-fiber connector, with a reflectivity of about 95%.

In the illustrated embodiment of this ring laser system according to the present invention, the mirror-FBG cavity length L' was kept relatively long (approximately 30 cm) to preserve the fiber pigtails on these elements. A 3 dB fiber coupler 420, for example, is used as an output port, the optical signal from which may be split again, as illustrated, in order to feed a photodetector (not shown) for mode-mode beat analysis by an RF spectrum analyzer (not shown), an optical spectrum analyzer (not shown), a 3 m unbalanced fiber interferometer (not shown), or the like.

FIG. 5A shows the optical spectrum of the output of the system of FIG. 4 with the ring disconnected (at point A in FIG. 4). The dip in the broadband fluorescence output at about 1548 nm is due to the fiber Bragg grating 402. Within this dip, a series of narrow-band transmission peaks are formed by the interaction of the FBG 402 and mirror 401, but are unresolved by the 0.1 nm instrument-limited resolution of the optical spectrum analyzer used.

FIG. 5B shows the output spectrum with the ring of FIG. 4 closed, and polarization controllers 421 and 422 ($PC_1$ and $PC_2$) adjusted to optimize the gain at 1548 nm. The ring lased at the center wavelength of the fiber Bragg grating 402, confirming the presence of transmission peaks in the vicinity of the Bragg bandwidth, and the operation of the mirror-Bragg grating combination (400) as a wavelength selective filter for this type of application.

FIG. 5C shows an instrument limited (0.1 nm) spectrum of the laser line. Observation of the beat-note spectrum, and the visibility and phase stability of the fiber MZ output interference signal confirm that, instantaneously, the laser operates in a single longitudinal cavity mode. However, frequent mode hops may occur with a period of a few seconds absent vibration and thermal isolation of the ring, and in particular, the active fiber section 406 housed within the amplifier module 416. Reduction of the acoustic and environmental sensitivity of the ring, and shortening the mirror-Bragg cavity improves single-frequency stability.

Figure 6A:
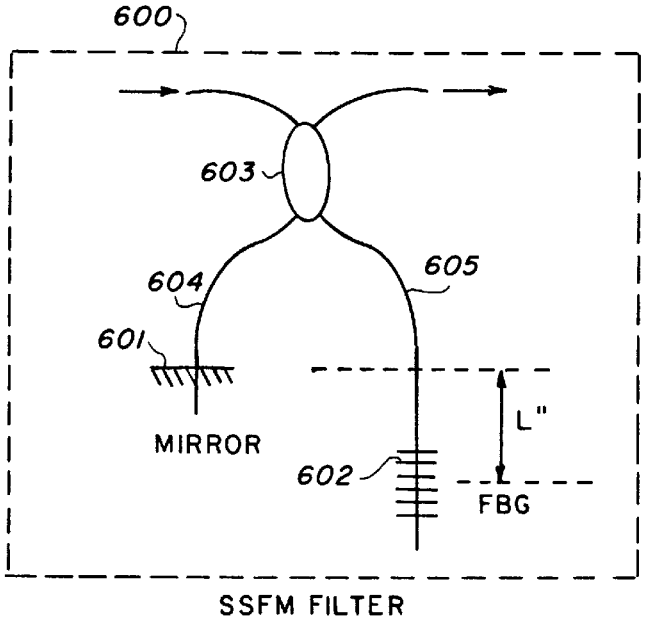
FIG. 6A illustrates a spectrally-selective fiber Michelson (SSFM) interferometric filter according to an embodiment of the invention formed as first and second fiber arms coupled together by a coupler, the first fiber arm having a mirror element disposed therein and the second fiber arm having a fiber Bragg grating formed therein.

FIG. 6A illustrates a spectrally-selective fiber Michelson (SSFM) interferometric filter formed with a mirror 601 and a fiber Bragg grating 602. First 604 and second 605 fiber arms are coupled together by a coupler 603, the first fiber arm 604 having mirror element 601 disposed therein and the second fiber arm 605 having fiber Bragg grating 602 formed therein. The distance L" represents the path length to reflective element difference between the two arms 604 and 605.

Figure 6B:
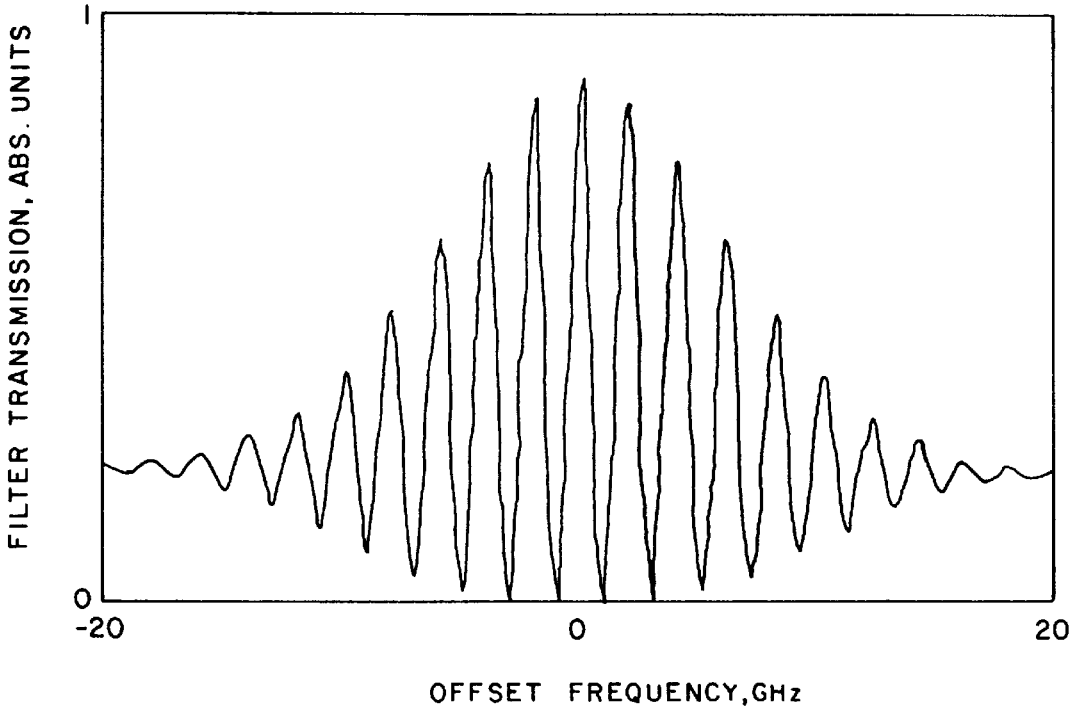
FIG. 6B illustrates the calculated transmission characteristic of the SSFM filter of FIG. 6A.

This SSFM filter can also be used in a ring laser configuration as an intra-ring lasing wavelength selector, for example, replacing the SSFFP 400 of the ring laser configuration of FIG. 4. FIG. 6B illustrates the calculated transmission characteristic of the SSFM filter of FIG. 6A.

It will be understood that the above description of the present invention is susceptible to various modifications, changes, and adaptations, and the same are intended to be comprehended within the meaning and range of equivalents of the appended claims.

An embodiment of a simple in-line fiber Fabry-Perot filter configuration has been disclosed based on the use of a fiber Bragg grating element in conjunction with a normal mirror element. The resulting transmission function provides Fabry-Perot transmission characteristics within an envelope determined by the bandwidth of the fiber Bragg grating, whereas outside of this wavelength region, the filter is characterized by an attenuation level determined by the mirror reflectivity. In another embodiment, a Michelson interferometric filter is formed with comparable transmission characteristics.

These simple filter configurations are useful in providing wavelength selection in a fiber ring laser as disclosed, and should be useful in other laser configurations, as well, or anywhere where high-Q, narrow-band filtering is desirable. The filter configuration according to the present invention would also find use in the wavelength stabilization of laser sources, for example, as a wavelength selective sensor element in feedback circuitry to adjust the laser source output wavelength.

The present invention is not limited to the use of intra-core Bragg gratings, and could be used with other fiber grating manufacturing techniques, e.g., side polished devices, etc. In side polishing, a fiber piece is polished to expose the core, and then a polymer layer having a different index of refraction from the core is applied to selected regions. The resulting effective index changes in these regions forms a Bragg grating effect in the fiber piece in a similar, if less pronounced and efficient, manner to the intra-core grating technique previously described. Fiber gratings could also be made by selective ion beam implanting in the core to establish the variations in refractive index required. Other uses of the SSFFP filter include applications such as a reference cavity for frequency stabilization of lasers, and as sensor elements in a wavelength division addressed multiplexed system, with each fiber Bragg grating being written at a different wavelength.

What is claimed and desired to be secured by Letters Patent of the United States is:

1. A fiber-optical filter formed in a fiber piece, said filter comprising:

a broad-band mirror formed in the fiber piece; and a narrow-band fiber Bragg grating element having a bandwidth and formed some distance L from said broad-band mirror in the fiber piece;

wherein said broad-band mirror and said narrow-band fiber Bragg grating element form therebetween a Fabry-Perot cavity of length L in the fiber piece resonant in a wavelength region within the bandwidth of said fiber Bragg grating element.

2. An in-line, spectrally-selective fiber Fabry-Perot transmission filter comprising:

an optical fiber piece having a broad-band mirror and a narrow-band Bragg grating element formed therein, said mirror and said grating forming a Fabry-Perot resonant cavity therebetween.

3. The filter of claim 2 wherein:

said narrow-band Bragg grating element is an intra-core Bragg grating element.

4. The filter of claim 2 wherein:

said mirror is a metalized fiber-fiber connector having a predetermined reflectivity of about 95%; and said Bragg grating element has a center wavelength in the range from about 1525 nm to about 1565 nm, a relatively narrow bandwidth of less than 0.2 nm, and a peak reflectivity approximately equal to the predetermined reflectivity of said mirror.

5. A fiber ring laser configuration for providing an optical output signal, comprising:

a fiber amplifier unit including a pump laser for producing an optical output, an amplifying fiber piece and a first coupler, said first coupler coupling the optical output and an input to be amplified into said amplifying fiber piece, said amplifying fiber piece providing an output of said fiber amplifier unit;

first isolation means, coupled to receive the output of said fiber amplifier unit, for providing unidirectional operation;

fiber optical filter means for narrow-band wavelength filtering of the output of said fiber amplifier unit, said filter means having a first end coupled to said first isolation means, having a second end, and including a broad-bandwidth mirror and a narrow-bandwidth fiber Bragg grating element formed some distance L from said broad-bandwidth mirror, wherein said broad-bandwidth mirror and said narrow-bandwidth fiber Bragg grating element form therebetween a Fabry-Perot cavity; and a second coupler coupled to said second end of said fiber-optical filter means and being responsive to a narrow-band wavelength filtered output therefrom for providing a portion of the narrow-band wavelength filtered output as the optical output signal of the ring laser configuration.

6. The fiber ring laser configuration of claim 5 further including:

second isolation means coupled to said second coupler and being responsive to a second portion of the narrow-band wavelength filtered output of said filter means for providing to said first coupler the second portion of the narrow-band wavelength filtered output as the input to be amplified.

7. The fiber ring laser configuration of claim 5 wherein:

said broad-bandwidth mirror is a metalized fiber-fiber connector having a predetermined reflectivity; and said narrow-bandwidth fiber Bragg grating element is an intra-core Bragg grating having a center wavelength in the range from about 1525 nm to about 1565 nm, a relatively narrow bandwidth, and a peak reflectivity approximately equal to the reflectivity of said mirror.

8. The fiber ring laser configuration of claim 5 further including:

at least one polarization controller for adjusting the gain of the fiber ring laser configuration.

9. A spectrally-selective fiber Michelson interferometric filter comprising:

a coupler;

first and second fiber arms coupled together by said coupler, said first fiber arm having a mirror element disposed therein and said second fiber arm having a fiber Bragg grating formed therein.

10. The spectrally-selective fiber Michelson interferometric filter of claim 9 wherein:

said mirror element is formed by a metalized fiber-fiber connector with a predetermined reflectivity; and said fiber Bragg grating element has a center wavelength in the range from about 1525 nm to about 1565 nm, a predetermined bandwidth, and a peak reflectivity approximately equal to the reflectivity of said mirror element.

11. A fiber ring laser configuration for providing an optical output signal, comprising:

a fiber amplifier unit including a pump laser for producing an optical output, an amplifying fiber piece and a first coupler, said first coupler coupling the optical output and an input to be amplified into said amplifying fiber piece, said amplifying fiber piece providing an output of the fiber amplifier unit;

first isolation means, coupled to receive the output of said fiber amplifier unit, for providing unidirectional operation;

fiber optical filter means for narrow-band wavelength filtering of the output of said fiber amplifier unit, said filter means coupled to the first isolation means, and including a broad-bandwidth mirror and a narrow-bandwidth fiber Bragg grating element, wherein said filter means is a spectrally-selective fiber Michelson interferometric filter having first and second fiber arms coupled together, said first fiber arm having said broad-bandwidth mirror formed therein and said second fiber arm having said narrow-bandwidth fiber Bragg grating formed therein; and a second coupler coupled to said fiber-optical filter means and being responsive to a narrow-band wavelength filtered output therefrom for providing a portion of the narrow-band wavelength filtered output as the optical output signal of the ring laser configuration.

12. The fiber ring laser configuration of claim 11 further including:

second isolation means coupled to said second coupler and being responsive to a portion of the narrow-band wavelength filtered output of said filter means for providing said portion of the narrow-band wavelength filtered output to said first coupler as the input to be amplified.

13. A method of forming an in-line, spectrally-selective fiber Fabry-Perot transmission filter, said method comprising the steps of:

providing an optical fiber piece;

forming a broad-band mirror in the fiber piece;

forming a narrow-band Bragg grating element in the fiber piece; and utilizing the mirror and the grating to form a Fabry-Perot resonant cavity therebetween.

14. The method of claim 13 wherein said step of forming the broad-band mirror includes the step of:

forming a metalized fiber-fiber connector having a predetermined reflectivity in the fiber piece.

15. The method of claim 14 wherein said step of forming the narrow-band Bragg grating element includes the step of:

forming an intra-core fiber Bragg grating element by the application of interfering beams of ultraviolet light to a fiber core so that the grating has a center wavelength in the range from 1525 nm to about 1565 nm, a predetermined bandwidth, and a peak reflectivity approximately equal to the predetermined reflectivity of the mirror.

16. The method according to claim 14 wherein said step of forming the narrow-band Bragg grating element includes the step of:

forming a Bragg grating by side-polishing.

* * * * *